UNITED STATES PATENT OFFICE.

PETER HUNTER, OF CORVALLIS, OREGON.

IMPROVEMENT IN MEDICAL COMPOUNDS, OR WATER-DOCK SALVES.

Specification forming part of Letters Patent No. 146,133, dated January 6, 1874; application filed December 26, 1873.

*To all whom it may concern:*

Be it known that I, PETER HUNTER, of Corvallis, Benton county, Oregon, have invented a certain Compound called Water-Dock Salve, of which the following is a specification:

The nature of my invention consists in mixing water-dock root, sour-dock root, yellow-dock root, butter, alum, and balsam of fir together by heat.

To prepare the "water-dock salve," I take one pound of water-dock root, one pound of sour-dock root, one pound of yellow-dock root, and six pounds of butter, and mix together by heat, stirring the same to keep it from burning until the roots turn brown. I then strain while hot, and mix, by stirring, one ounce of alum and one ounce fir balsam with the above altogether. I then let it cool, when it becomes of the consistency of salve, and ready for use.

The salve can be applied for the cure of all kinds of sores, burns, scalds, and cutaneous and eruptive diseases of the flesh. It can be used as well upon man as beast, and is applied by rubbing on the flesh with the hand, or spread upon a cloth and applied to affected parts. For some diseases, such as piles, it can be used as an injection.

I claim as my invention—

The manufacture or preparation of a compound which I denominate water-dock salve, of the ingredients, in the proportions, and for the purposes set forth.

PETER HUNTER.

Witnesses:
WILLIAM B. HAMILTON,
JAMES A. YANTIS.